E. H. KELLEY.
MATERIAL TESTING DEVICE FOR VENDING MACHINES.
APPLICATION FILED APR. 10, 1911.
1,147,407.
Patented July 20, 1915.
6 SHEETS—SHEET 1.
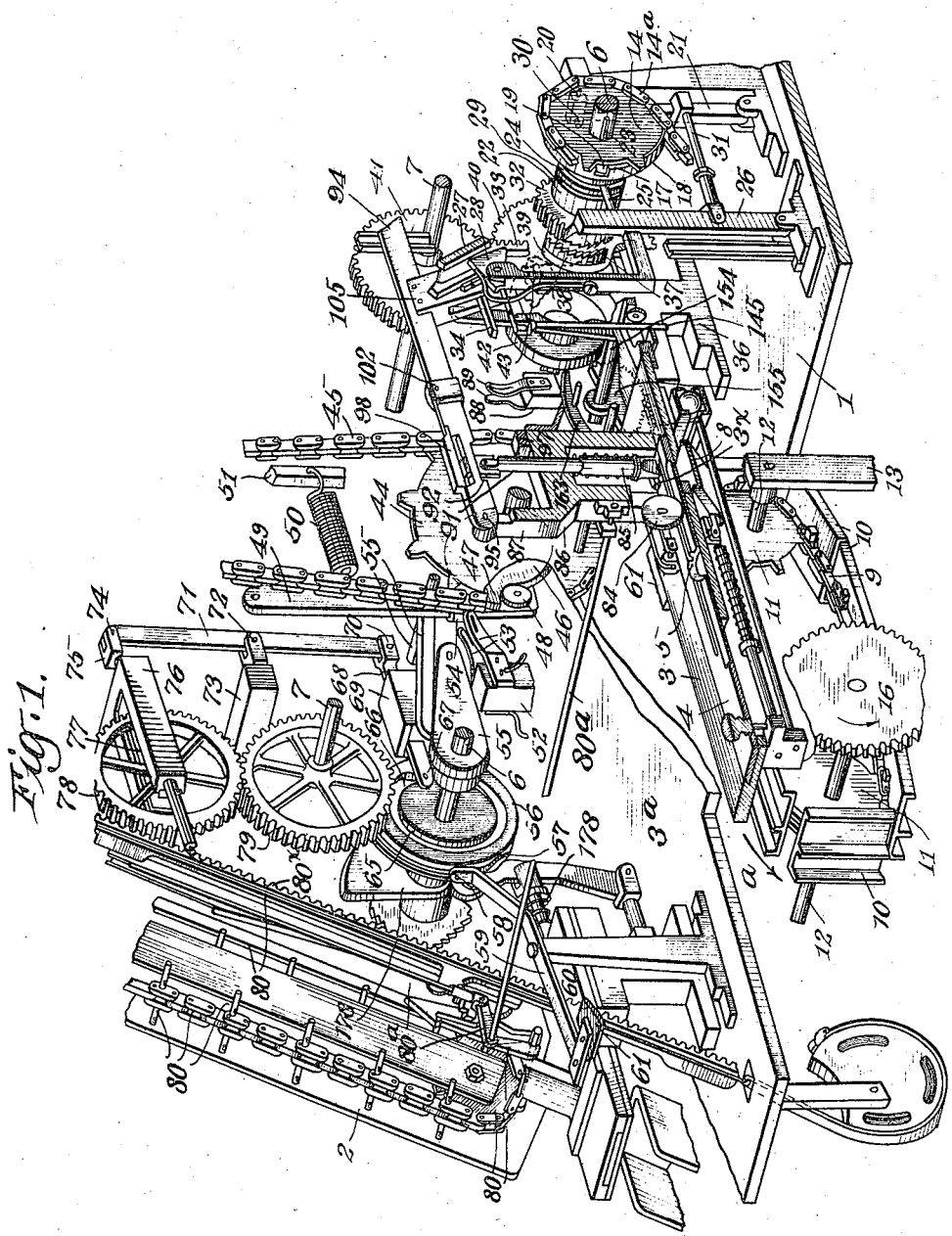

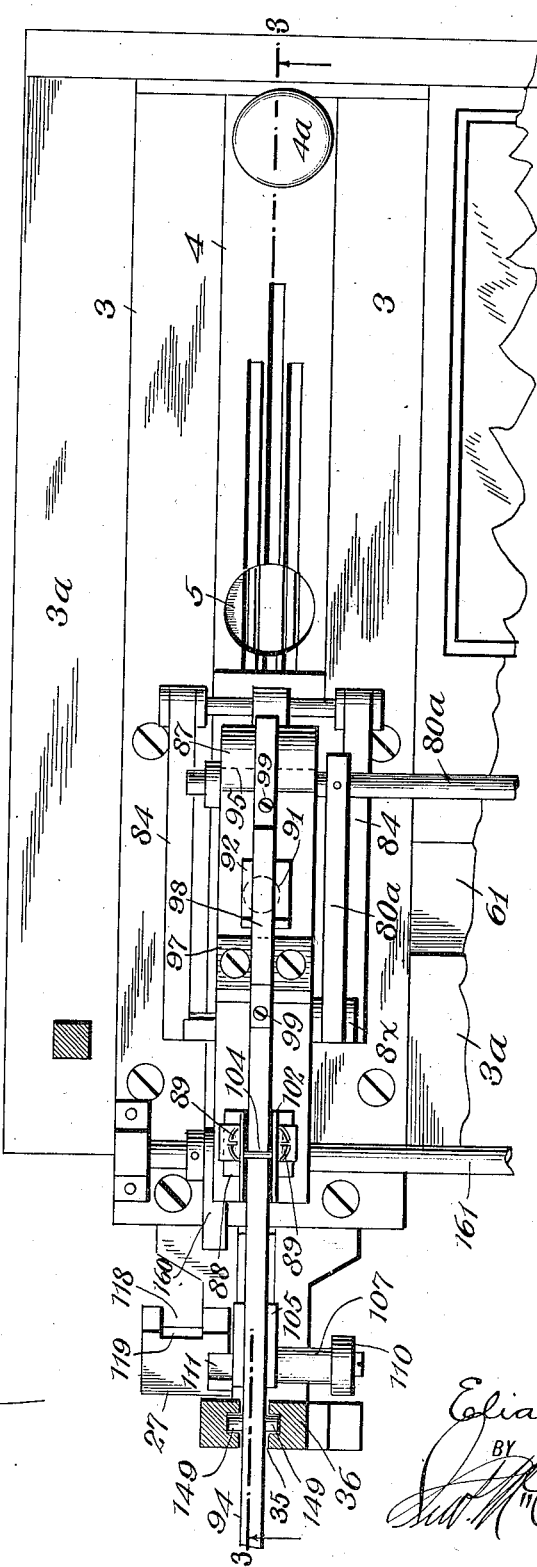

E. H. KELLEY.
MATERIAL TESTING DEVICE FOR VENDING MACHINES.
APPLICATION FILED APR. 10, 1911.
1,147,407.
Patented July 20, 1915.
6 SHEETS—SHEET 3.
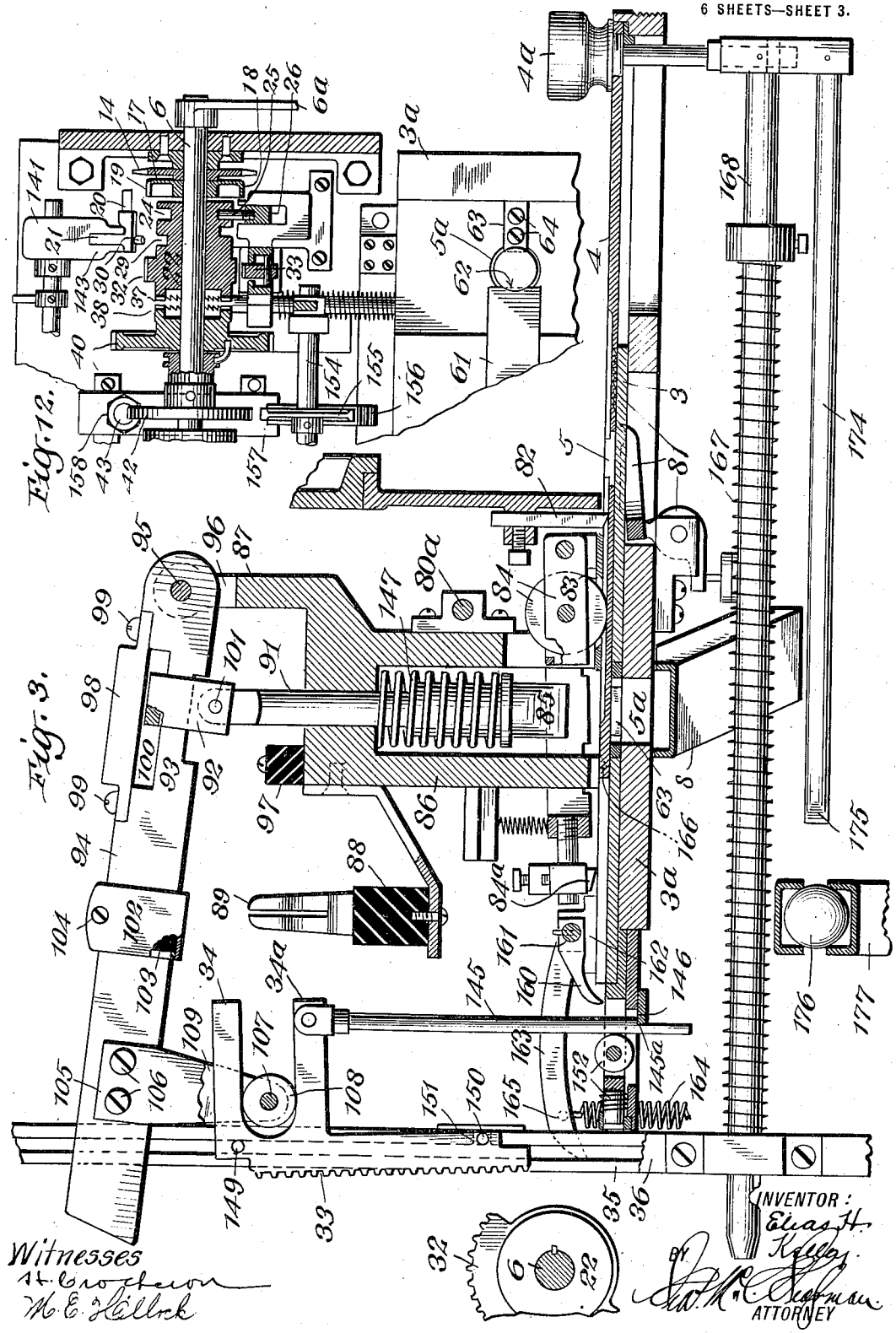

E. H. KELLEY.
MATERIAL TESTING DEVICE FOR VENDING MACHINES.
APPLICATION FILED APR. 10, 1911.
1,147,407.
Patented July 20, 1915.
6 SHEETS—SHEET 4.
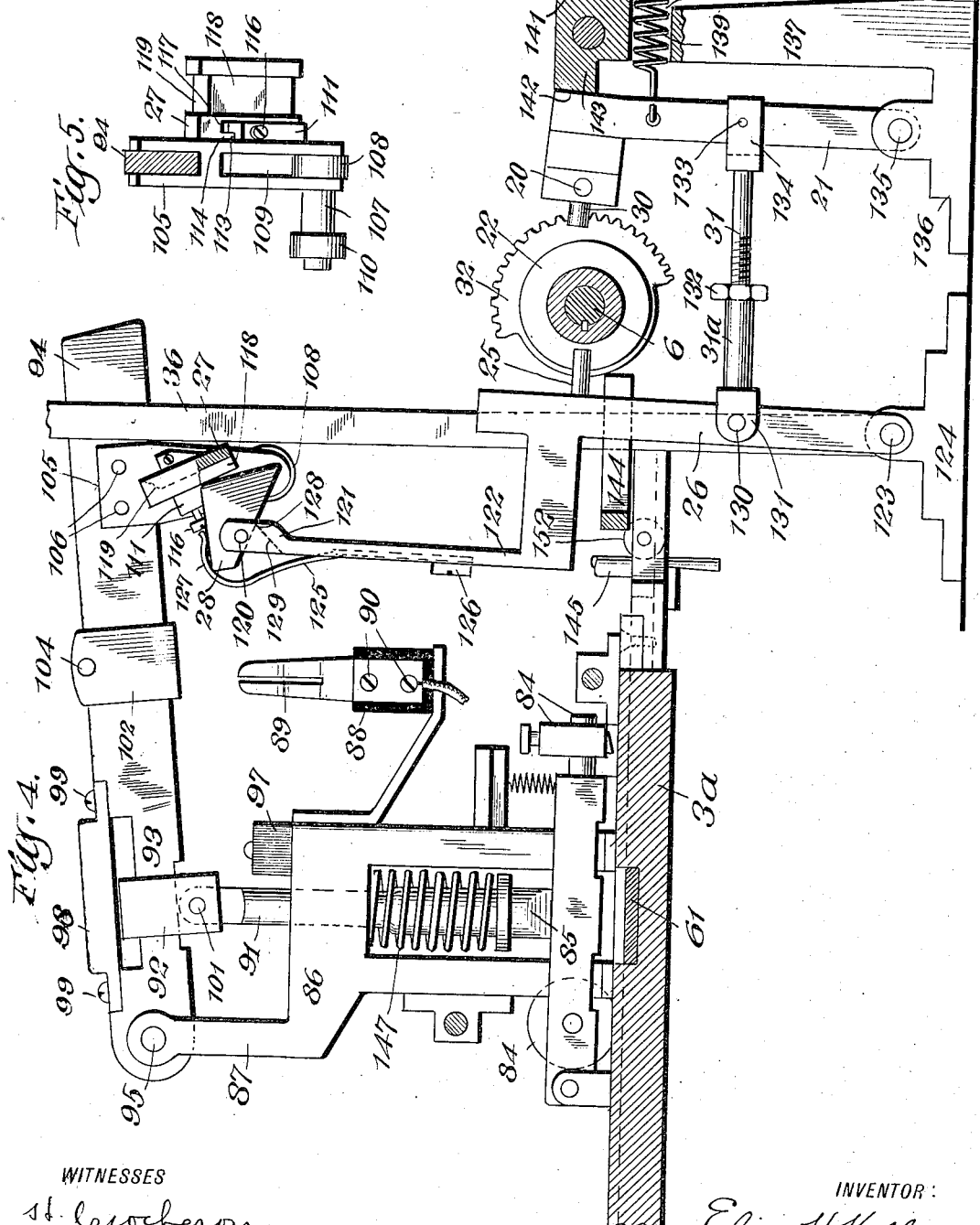

E. H. KELLEY.
MATERIAL TESTING DEVICE FOR VENDING MACHINES.
APPLICATION FILED APR. 10, 1911.
1,147,407.
Patented July 20, 1915.
6 SHEETS—SHEET 5.
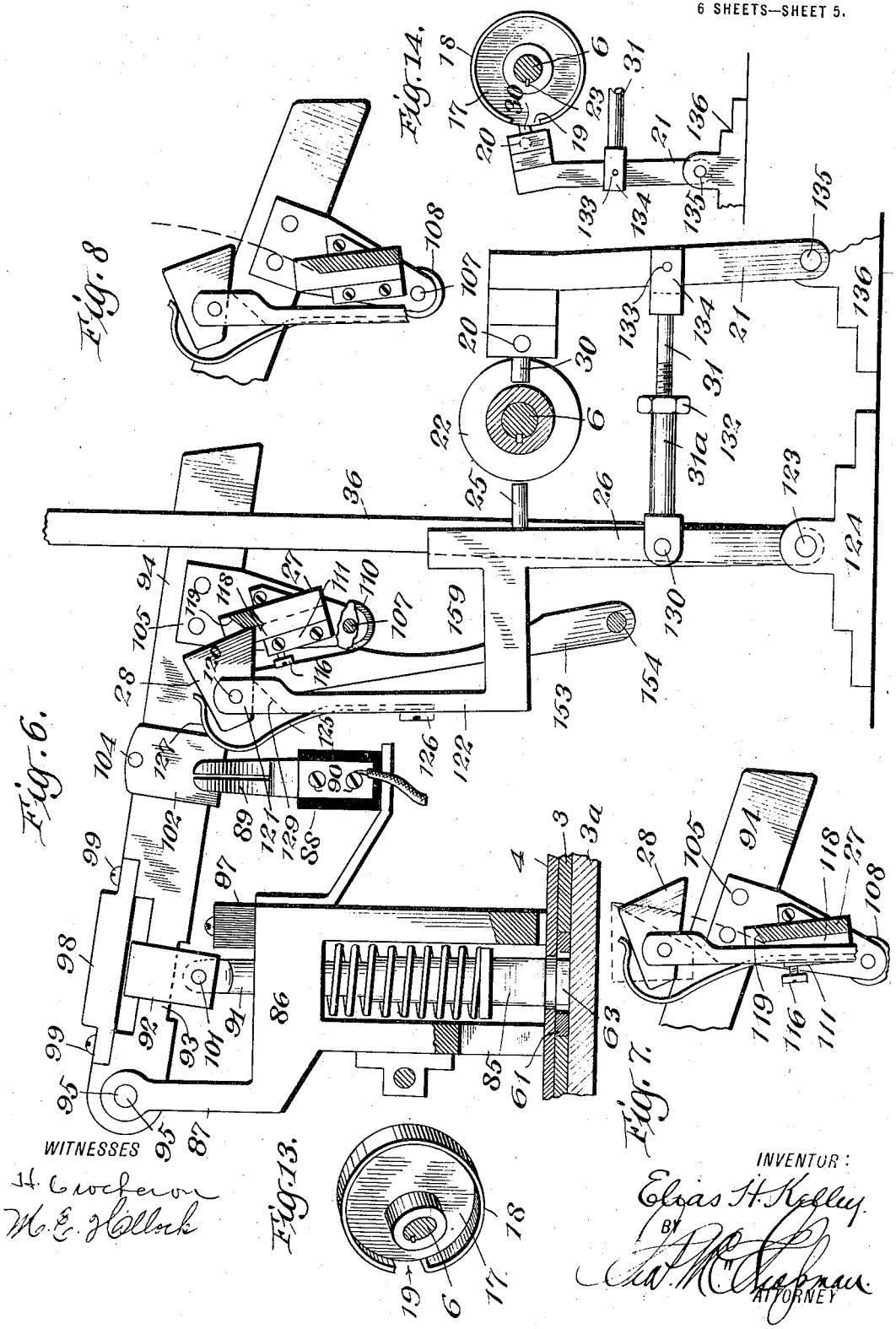
WITNESSES
INVENTOR:
Elias H. Kelley.
BY
ATTORNEY E. H. KELLEY.
MATERIAL TESTING DEVICE FOR VENDING MACHINES.
APPLICATION FILED APR. 10, 1911.
1,147,407.
Patented July 20, 1915.
6 SHEETS—SHEET 6.
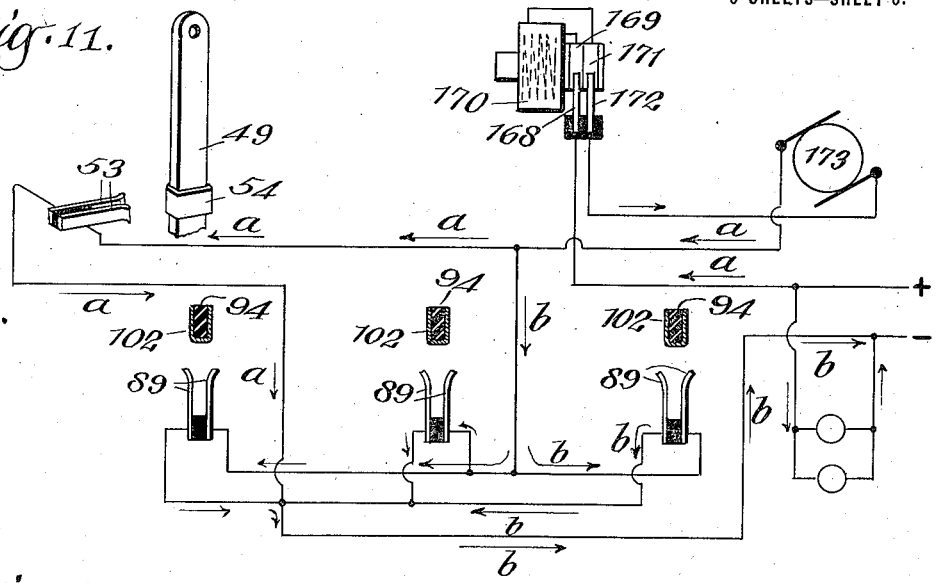
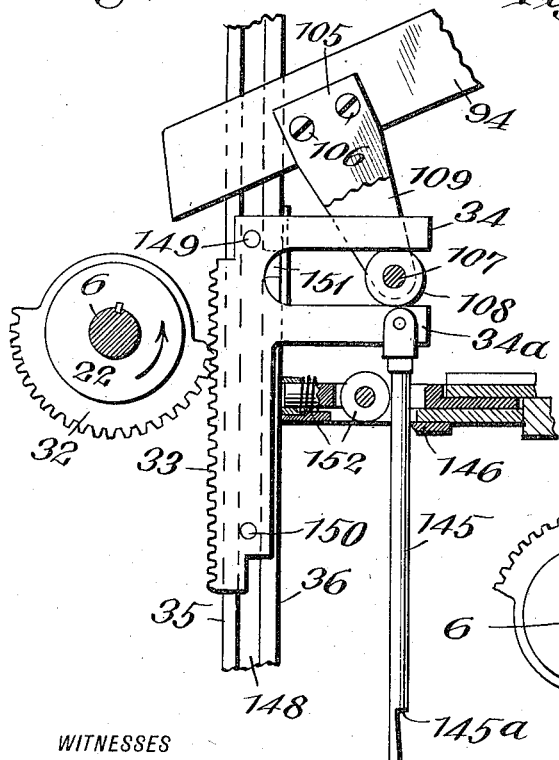
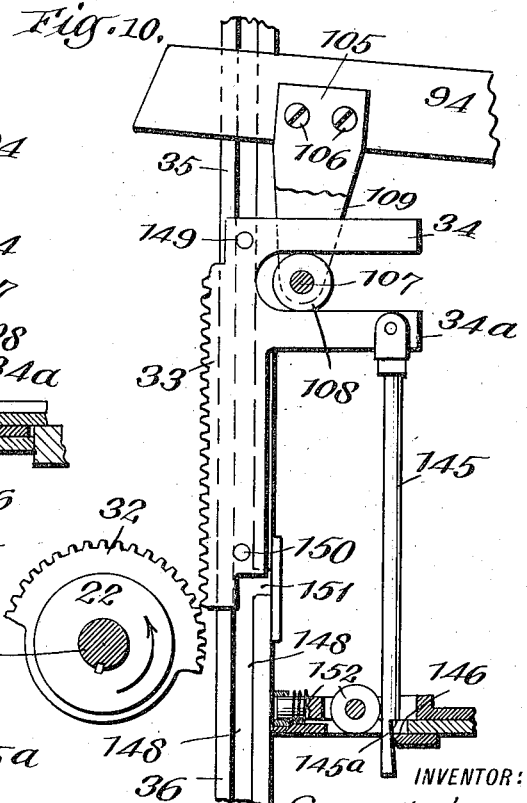
WITNESSES
INVENTOR:
Elias H. Kelley.
BY
Geo. W. Chapman.
ATTORNEY

UNITED STATES PATENT OFFICE.

ELIAS H. KELLEY, OF NEW YORK, N. Y.

MATERIAL-TESTING DEVICE FOR VENDING-MACHINES.

1,147,407.   Specification of Letters Patent.   Patented July 20, 1915.

Original application filed December 17, 1909, Serial No. 533,638. Divided and this application filed April 10, 1911. Serial No. 619,989.

*To all whom it may concern:*

Be it known that I, ELIAS H. KELLEY, a citizen of the United States, residing in the borough of Manhattan, city, county, and State of New York, have invented a new and useful Improvement in Material-Testing Devices for Vending-Machines, of which the following is a description.

This invention relates to vending machines of the coin or check controlled type, and particularly relates to material testing mechanism for such machines.

Primarily, it is noted that the mechanism of my present invention has been designed with special reference to coin-controlled apparatus for vending tickets or other flat articles in web form wound in reels, such apparatus being made the subject of my application, Serial No. 533,638, filed December 17, 1909, and that this application is a division thereof.

Among the objects of my invention may be noted the following: to provide, in a check-controlled apparatus, a means for testing the material of which the check is made in order to determine whether, in point of fact, said check is a good coin of the proper denomination; to provide a material testing device which will prevent the machine from performing a functional operation except when a good coin of the proper denomination is inserted in the machine; to provide material testing apparatus with means making it impossible for the machine in which it is incorporated to effect the delivery of an article with anything other than a good coin of the proper denomination; to provide an apparatus for coin-controlled machines which will detect slugs, spurious coins, disks, rings and other things in form similar to a coin; to provide means under control so that but one coin at a time can effect the delivery of a ticket or article to be vended from the machine; to provide means which will insure the deposit of a coin in the conveyer of the machine so that a coin placed in the machine and reaching a certain position cannot be recovered by the operator; to provide a material testing apparatus in combination with an electric circuit whereby the operation of the apparatus will close the circuit and start the machine into operation; to provide a material testing apparatus, irrespective of how driven, with a unit mechanism capable of use for single checks or coins and capable of multiplication to any desired extent to produce a gang-machine operable by any number of coins or checks of any predetermined value or character; to provide a material testing mechanism in combination with a feeding or delivery mechanism capable of automatically discriminating between a good coin of the proper denomination and any other form of check, so as to start the feeding mechanism into operation for the good coin and prevent the operation of the feeding mechanism in the presence of the other form of check; and to provide novel elements and mechanisms and combinations of elements and mechanisms operating automatically to produce functions according to a given rule of action imposed thereon by the coins or checks inserted in the machine and constituting the initial control.

With the above objects in view and others which will be detailed during the course of this description, my invention consists in the elements, mechanisms, parts and features and combinations of elements and mechanisms as hereinafter described and claimed.

In order that my invention may be clearly understood, I have provided drawings wherein:

Figure 1 is a view showing, in perspective, a "unit," in combination with certain essentials of my vending machine, the view being made by breaking out duplicated units and disposing the essentials in close relation; Fig. 2 is a plan view of one of the slide mechanisms showing certain features of the material testing mechanism, parts being in section and a portion being broken away; Fig. 3 is a sectional elevation taken substantially on the line 3—3 of Fig. 2; Fig. 4 is a view showing in elevation and section my material testing mechanism in combination with other coöperating parts; Fig. 5 is an elevation and partial section of the clutch-controller; Fig. 6 is a view similar to Fig. 4, but showing the mechanism in an operative position and omitting certain of the parts; Figs. 7 and 8 are detail views in elevation showing the clutch-controller in different positions; Fig. 9 is an elevation and partial section of a portion of the coin-controlled mechanism showing the tripping mechanism in its lowermost position; Fig.

10 is a view similar to Fig. 9 but showing the tripping mechanism in its uppermost position; Fig. 11 is a diagrammatic view of the electric circuits of the machine and illustrating, sufficiently for the purpose of this application, the motor, magnetic-clutch and electrical contacts included in the circuits; Fig. 12 is a horizontal section and partial plan of the right-hand end of the driving-shaft and of certain of the mechanism carried thereby forming part of a "unit" of my machine; Fig. 13 is a perspective view of the clutch controlling-drum; and Fig. 14 is a side elevation of the controlling-drum and coöperating means.

Referring to the drawings, the numeral 1 indicates a support or mid-plate which, in my aforesaid parent application, is suspended in the frame and which supports all the coöperating mechanism illustrated in Fig. 1.

2 is a side-plate or supporting portion of the feeding mechanism.

3 is a coin-slide holder in which the coin-slide 4 operates, the two being connected by a dove-tail form of groove and flange, as shown in Fig. 1. The coin-slide 4 has a coin-aperture 5 therein of a form and size to just receive the particular coin intended to operate the machine and which, according to my invention, may be either a five-cent piece, a ten-cent piece, a quarter, or a half-dollar.

6 is the driving-shaft of the machine which is journaled to rotate in accordance with the rule of action of the machine. The feed-shaft of the machine is indicated by 7 and is caused to rotate periodically, as will be presently described, this shaft being journaled above the driving-shaft 6, as shown in Fig. 1. Coöperating with the coin-slide is a chute 8 the lower end of which terminates just above a coin-conveyer consisting of a chain 9, the links of which carry coin-cups 10, said chain coöperating at opposite ends with sprocket-wheels 11 carried by shafts 12 journaled in suitable uprights similar to 13. The conveyer receives the coin from the chute 8 and carries it toward the front of the machine or in the direction of the arrow *a*, Fig. 1, and at this point each of the cups 10 is tilted, thus causing the coin to slide therefrom into a suitable coin-box or receptacle, not shown herein because forming no part of my present invention.

My invention and its mode of operation will be better understood, primarily, by reference to Fig. 1, wherein the essentials of the vending machine are shown; that is to say, it should be understood that the operation of the feeding mechanism, for a functional purpose, depends in my machine, upon the movement and operations of certain trains of mechanism under the influence of a given good coin, and the amount of feed movement being dependent upon the coin. In other words, the web of articles is supported, controlled, fed and a certain number cut off and delivered, according to conditions in or at the coin-slide, and in order that my material or tensile strength testing mechanism may be understood, the unit mechanism of Fig. 1 will be explained. In this figure when the main-shaft 6 is started by either a motor, or by a crank 6ª, Fig. 12, the sprocket-wheel 14 will be rotated, the same being fixed to the shaft in any usual way, such rotation driving the sprocket-chain 15, which drives the coin-conveyer mechanism of which the gear 16 is a part, (further reference to which is unnecessary since it forms no part of my present invention), said conveyer, however, receiving the coins deposited in the machine and taking care of them in the manner clearly set forth in my parent application, above referred to. It may be noted that though the specific form of conveyer and actuating mechanism are not a part of my present invention, the combination of said conveyer with my material testing mechanism is an important part of my present invention, as will presently appear.

Next to the sprocket-wheel 14 on the driving-shaft 6 is fixed, by a spline or other means, the disk 17, detail views of which are shown in Figs. 13 and 14. This disk has a flange 18, provided with a slot 19. This structure forms a drum which is located so that its slot 19 will coöperate with the pin 20 on the head of the lever 21. This coöperation between the drum and the pin 20, whereby, at one time, the pin enters the drum and is held in coöperation with the same for a complete rotation of the driving-shaft, and at another time said pin is prevented from entering said drum by the flange 18, to prevent a functional operation of the machine, will be presently more fully set forth.

Next to the drum on the driving-shaft 6 is a sliding-cylinder 22, held for rotation on said shaft by the spline 23, this cylinder having a circumferential groove 24, in position to coöperate with the pin 25, carried by the lever 26, this coöperation taking place when the cam-block 27 passes, in its upward movement, the spring-controlled cap-piece 28 and assumes the position shown in Fig. 4, so as to hold the cylinder 22 from longitudinal movement on the shaft 6. Next to groove 24 in the cylinder is another circumferential groove having a cam-jog 29, this groove being in position to coöperate with the pin 30 on the head of the lever 21. When the pin 30 is operating in the cam-groove 29, the pin 25 of the lever 26 has withdrawn from groove 24, since the two levers 26 and 21 are connected together by adjustable rod 31. The coöperation of pin 30 and groove 29 will cause the cylinder 22 to move laterally toward the left, this operation being said arm limiting the rearward movement of said lever 26. Thus, the levers are joined together for movements in unison toward and from the driving-shaft 6, the functions of which movements will be presently described. The adjustable connection 31—31ª, between the levers 21 and 26, has several important functions, since it joins said two levers for synchronous operations toward and from the driving-shaft 6, to bring about or prevent certain operations presently described, see Fig. 4; enables an adjustment to be made to hold the connected levers in proper coöperative relation; and enables the lever 26 to be so adjusted relatively to the lever 21, as to bring about the proper coöperative action of the cam-block 27 and the cap-piece 28, viz., to cause said cam-block to strike the cap-piece on the downward movement of the former, Fig. 6, and enable the cap-piece to avoid the cam-block on the upward movement of the latter for a functional operation, Fig. 8, dotted line, and be tilted back on the upward movement of the cam-block for a non-functional operation, dotted lines, Fig. 7. This will be fully explained presently. The levers 26 and 21 are actuated by the cam-block 27 carried by the lever 94, which lever is tripped into action by the coin-slide when the latter is permitted to slide to its extreme rearward position, as before noted, so as to push the tripping-rod 145 from its ledge or rest 146 thus allowing the expansive power of the spring 147 to force the said lever 94 downwardly through its connection with the ram. The tripping of the rod 145 by the coin-slide, results in forcing rearwardly the angular lever having along its rear the rack 33 and at its top a bifurcated portion the arms 34 and 34ª of which embrace the anti-friction roll 108 carried by the bearing 105 of lever 94, and the upper one of the two arms 34 passing through the slot 109 of said bearing and the other one passing below the same.

The angular lever operates within the longitudinal slot 35 extending from back to front of the upright 36 which latter is provided internally with the opposite grooves 148 in which travel oppositely extending pins 149 projecting from the upper end of said angular lever. Near its lower end the said angular lever is provided with oppositely extending pins 150, which normally rest in opposite notches 151, in the sides of the front of the upright 36, as clearly shown in Figs. 3, 9 and 10. When the end of the coin-slide 3 engages the tripping-rod 145 and pushes the same from the ledge 146 the spring 147 will force the lever 94 downwardly and it in turn, through the medium of the roll 108 carried by the bearings 105 will force down the angular lever; that is to say, in the position of Fig. 3 the tripping-rod 145 through its pivotal connection 145ª holds the angular lever with its pins 150 in the notches 151 of the upright 36, the pins 149 at the top of said lever acting as a fulcrum, bearing against the walls of the opposite slots 148 and the power of the spring 147, transmitted through the lever 94 and bearing 105, helps to maintain said pins 150 in the notches 151, the plane of pressure of the roller 108 being substantially vertical and parallel with the upright 36. On the other hand, the arms 34 and 34ª of the angular lever, in this position of parts, sustain the lever 94 which, in turn, hold the ram elevated and the spring under compression, or with power stored ready for action.

When the rod 145 is tripped by the coin-slide, the stored power of the spring acts instantly and powerfully to swing the lever 94 on its fulcrum 95 causing the bearing 105 to operate in the arc of a circle described about said fulcrum 95, thus causing the angular lever to swing rearwardly on the pins 149 as a fulcrum and then descend in the upright 36, being guided in its movement by both pairs of pins 149 and 150 in the slots 148 of said upright. This places the rack 33 in coöperative relation with the mutilated-gear 32, carried by driving-shaft 6, Fig. 9, which, in turning in the direction of the arrow, will lift said angular lever, the lever 94, the trip-rod 145, and the ram 91, and since the roll 108 is riding toward the pins 149, the tendency of the lower end of the angular lever is toward the front of the machine, thus pressing its pins 150 against the front walls of the slots 148. The mutilated-gear 32 continues its lifting action on the rack 33 until the position of Fig. 10 is reached, at which time the pins 150 have risen slightly above the notches 151 and the notch 145ª of the trip-rod 145 is above the rest 146. When this condition of parts occurs, the spring-controlled plunger 152 pushes the trip-rod 145 forward so that its notch 145ª will descend upon the rest 146, the mutilated-gear imparts its lifting action upon the last tooth of the rack 33, which momentarily releases the angular lever and subjects it to the action of the ram-spring 147 through the lever 94 and bearing 105. The downward pressure of this spring being powerful, the angular-lever is instantly and with considerable force driven downwardly thus bringing the notch of the tripping-rod 145 forcibly upon rest 146 and causing said rod to become a fulcrum for the angular-lever, the lower end of which instantly swings toward the front of the machine and drives its pins 150 with a snap into the notches 151 of the upright 36. This action carries the rack 33 away from the mutilated-gear 32, and their coöperative relation is lost. It will thus be seen that the angular-lever is similar, as to certain of its operations, to a bell-crank lever, but that five cent slide on the extreme right of the machine and will run to the outer one of the contact-members 89 which, if the contact-device 102 of the lever 94 of the tensile strength testing mechanism be in coöperative relation with said spring-contacts 89, will pass the current by way of the lead $b$ through to the source of power as indicated by the negative sign —. This completes a circuit and thereby drives the sprocket-chain 45 and the driving-shaft 6 and the clutch-members 37 and 38 will be brought into driving connection, thus imparting rotary movement to the feed-gears 40 and 41 and the feed-shaft 7 resulting in a functional operation, such as the delivery, in this instance, of five tickets from the machine. During the rotation of the driving-shaft the cam 47 will coöperate with the anti-friction roll 48 carried by the switch-bar 49, thus forcing the contact-member 54 between the two contacts 53, and substantially at the same time, the mutilated-gear 32 will coöperate with the rack 33 of the angular tripping-lever, thus lifting the lever 94 and breaking the circuit through the contact-members 102 and 89. This breaking of the circuit in the lead $b$, taking place just after the lead $a$ is closed by the contact-members 53 and 54 results in shunting the current along lead $a$, the latter to the lead $b$ and to the negative side of the main or generator. By causing the circuit at 89—102 to be broken just after the closing of the circuit at 53—54, sparking is eliminated and the operation of the machine is rendered continuous. The passing of the cam-portion 47 from the roller 48 permits the spring 50 to take control of the switch-bar 49 and thus withdrawing its contact 54 from the contacts 53 and breaking circuit $a$ and stopping the machine, this action taking place at the end of a complete rotation of the driving-shaft, which produces, under the influence of a good coin of proper denomination, a complete feed movement of the feed-chain and the severing and delivery of the proper number of tickets into the chute 174.

The foregoing description has been given in connection with the single coin-slide mechanism in conjunction with all the other essentials of my vending machine of "unit" type; that is to say, though it has been assumed throughout the description, that the machine is to vend or deliver one, two or five articles, for convenience the coin-slide mechanism, located and adapted for delivering five articles, or articles representing in value twenty-five cents, has been described. And it should be borne in mind that this coin-slide mechanism or "unit" can be duplicated indefinitely in a gang-machine without duplicating any of the web manipulating or other feeding and delivery-mechanism essentials for carrying out the functions of the said unit. With these facts in mind and with the foregoing detailed description, the following mode of operation will be readily understood:

Assuming a source of electric current, the machine at rest and in readiness for the delivery of one or more articles, as the case may be, and assuming a good coin of the proper denomination, viz., a twenty-five-cent piece, inserted in the coin-aperture 5 of the coin-slide 4, the operator will push said slide inwardly or toward the rear of the machine by means of the handle or knob $4^a$, whereupon the coin will pass the thick-coin stop 82 and run under the depressing-plate 83 and gage-roller 84. Engagement of the coin and roller causes the stop-pin $84^a$ to be lifted, thus permitting the cam-lug $3^x$, on the end of the coin-slide to pass. Likewise, since the tickets are under the control of a feeler-mechanism $80^a$ stop-finger $80^x$ thereof is held up from interference with the cam-lug $3^x$. No obstruction being presented to the coin-slide and the operator having forced said slide to its rearward extreme limit of movement, the rear end thereof will engage said trip-rod 145 and drive it from its seat enabling the expansive power of the coiled-spring 147 to drive the ram 97 into engagement with the coin, which has been properly centered under said ram by the rearward movement of said slide. The tripping of the rod 145 brings the parts into the position shown in Figs. 6 and 9, with the cam-block 27 of the cocking-lever 94 in engagement with the cap-piece 28 and the two holding the pin 30 of the lever 21 in the cam-groove 29 of cylinder 22, the pin 30 within the drum 17, said pin having entered the slot 19 in the flange 18, and the pin 25 out of peripheral grooves 24. The same movement of lever 94 brings the roller 110 of bearing 105 into engagement with the arm 153 which is caused to rock the segment 155 and shift the buffer-post 158, thus enabling the shaft 6 to be turned. This is a functional position of all the parts just described and is preliminary to a functional operation of the machine. The movement of the coin-slide just described also brings the coin into position on the throat-plate 61—63 directly over the coin-escape opening $5^a$ in the slide-plate $3^a$ and this movement of the coin-slide also compresses the spring 167, surrounding the guide-rod 168, and thus stores up in said spring ample power to compel the return of the coin-slide to its normal inoperative position when the conditions are right for the purpose. Simultaneously with the centering of the coin, as above stated, the pawl 160, carried by the rock-shaft 161, drops into the V-shaped notch 166, at the right edge of the extreme rear end of said coin-slide, thus holding the latter against the power of the spring 167 to force it back to its normal position. The expansion of the spring 147 which drove the ram 91 into engagement with the coin, likewise operates upon the lever 94, through the slide 92 to turn said lever upon its fulcrum 95 and thus drive the same downwardly and force the angular trip-lever downwardly causing, at the same time, its pins 150 to slide from their bearings 151, in the upright 36, the trip-rod 145 shifted, as before suggested, permitting this operation. The downward movement of the lever 94 also brings the contact-device 102 into engagement with the spring-contact arms 89, thus closing the circuit $b$, Fig. 11. The downward movement of the angular-lever, guided by its pins 149 and 150 in the groove 35 of the upright 36, places its rack 33 in position such that the mutilated-gear 32 on the main-shaft 6 may coöperate with it at the proper time during the rotation of said shaft in the direction indicated by the arrow, Fig. 9. The forward movement of the coin-slide 4 is accompanied also by the forward movement of the rod 174, the forward beveled end 175 of which will be forced between two of the balls 176, contained in the carrier 177, thus driving said balls apart and filling all the vacant space within said carrier and preventing the entrance of anything else between said balls. This is a "gang" feature; that is to say, a feature used in connection with gang-machines, as will be presently described, and has no function in a machine composed of a single unit.

The circuit $a$ having been closed across the contacts 53—54, through the medium of the lead $b$, the magnetic-clutch 170 will operate and the motor 173 will operate to drive, through the medium of the chain 45, the sprocket 44 on the driving-shaft 6 and cause the rotation of the latter. Said shaft being thus rotated, the various elements and devices carried thereby are arranged in such coöperative relation and are so timed relatively and arranged in such coöperative relation to the other mechanisms of the machine as to produce, in one cycle of movement of said shaft 6, the following results: the jog in the cam-groove 65, in the side of the disk 56, will immediately operate upon the pin 67, and move the bar 68 longitudinally, said bar in turn vibrating the lever 71, which will move the slide 75 forward, thus moving forward the gear 78, which is always in mesh with gear 79 and also rides over the top of the latter.

Engagement of gear 78 with the upper end of the rack-bar $80^x$ is thus brought about, said rack-bar being so connected as to bring about an operative relation between these and coöperating elements of the feeding mechanism. Shortly after this operation, the continued rotation of the driving-shaft 6 will bring the jog 57 of the cam-groove in the periphery of the disk 56 into coöperation with the pin 50, carried by the lever 59, connected at its forward end to the throat-plate 61, resulting in shifting the throat-plate to the left sufficiently to permit the coin to be forced by the ram, still in engagement with it, through the aperture $5^a$ in the slide-plate $3^a$, said coin thus being caused to traverse the chute 8 and drop into one of the coin-cups 10 of the coin-conveyer which, in the meantime, has been started into operation through the medium of the sprocket-wheel 14, located at the extreme right end of the driving-shaft 6, motion being transmitted through the sprocket-chain $14^a$ to said conveyer by suitable connections such as shown in my said parent application. The position at this time of the pin 25, carried by the lever 26, the pin 20 of the lever 21, and the pin 30 of the latter lever, has been stated. The rotation of the driving-shaft causes the flange of drum 17 to hold pin 20 of the lever 21 under control, thus also holding the pin 20 of said lever in the cam-groove 29 of cylinder 22, so that said cam-groove will cause the shifting of said cylinder, and the coöperation of the circle of clutch-teeth 37 and 38 resulting in driving the gear 40, which meshes with gear 41 on shaft 7, rotation of which latter will rotate gear 79, which will rotate gear 78 now in mesh with rack-bar $80^x$, connected to the feed-mechanism. The shifting of the throat-plate 61, as stated, to drop the coin into the chute 8, marks the point at which the ramming function, or downward movement of the ram, is completed, the ram, its connected cocking-lever 94, the tripping-angle lever, and the trip-rod 145 being, in consequence, in readiness to be elevated and reset in their normal inoperative positions. These functions are accomplished subsequently to the shifting of the throat-plate 61 and by the continued rotation of the driving-shaft, which brings the mutilated-gear 32 into mesh with the rack 33 of the tripping-lever, see Fig. 9, the plain portion of said gear having theretofore been presented toward said rack. The mutilated-gear and rack now being in mesh, continued rotation of the driving-shaft causes the tripping-lever to be lifted, the fork of the latter operating to lift the lever 94, through the medium of the bearing 105 and its connections, and thus also lifting the ram 91, through the medium of the sliding-shoe 92, thus compressing the spring 147 and storing up power therein preparatory to its next operation to test the next coin placed in the coin-slide. The trip-rod 145 is also lifted and reset upon the rest 146 and pins 150 of tripping lever are reset in notches 151, as previously described in detail. This operation results in recocking the ram 91 and returning the cocking-lever 94, with cam-block 27, to normal position. Simultaneously with the lifting of the lever 94, the circuit completed by the contacts 89 and 102 is broken; but, just prior to the breaking of this circuit, the circuit a is completed by the shifting of the contact-bar 49, so as to enter the contact 54 between the contacts 53, this being accomplished by the cam 47 carried by the driving-shaft, said cam operating upon the roll 48, carried by the said bar 49, the shifting of said bar being against the pull of its spring 50 which, during said movement is extended and thus has power stored therein for the purpose of, at the proper time, returning said bar 49 to its normal inoperative position. At the same time the feed-mechanism completed its feeding function, the cutting mechanism operated to sever the articles from the web, said cutting mechanism being indicated generally by the reference character 178. At this time the driving-shaft has made about a half rotation and the coin-slide has been held from returning to its normal position by engagement of pawl 160 in notch 166 of said slide. The buffer-cam now comes into coöperation with the arm 163 on the rock-shaft 161 resulting in lifting said pawl 160 and freeing said coin-slide. The spring 167, or yielding, retrieving device, immediately takes control and returns the coin-slide to its normal inoperative position. Should attempt be made to hold the slide in, the cam mechanism 55 of the positive retrieving device, now comes into action and will force the slide forward beyond the stop-pin 84ª, thus preventing defrauding the machine. The positive retrieving mechanism is fully described in my parent application. The recocking of the ram, as before described, is completed substantially at this time, which is about three-quarters of a rotation of the driving-shaft. The pressure of the spring 147 coupled with the seating of the rod 145 upon the rest 146 holds all the connected parts in an inoperative position with the rack 33 of the angle-lever out of the path of rotation of the mutilated-gear 32, and in such position that said gear cannot engage the rack, or the lever, should a successive rotation of the driving-shaft 6 take place. At this point, note should be taken of the fact that the ram-spring 147 is the holding factor, since its downward pressure upon the ram transmits its power through the latter to the bearing 105, through the latter to the trip-rod 145, which is firmly held at rest at 146, said rod becoming, in point of fact, the fulcrum, or one of the fulcra, for said angle-lever resulting, in combination with the pins 150, in holding the lower end of the angle-lever in the position shown in Fig. 3, with its oppositely-extending pins 150 firmly set in the notches 151 of the upright 36.

As the ram is reset by the cocking of the lever 94 the buffer-post 158 returns to the path of the cam 42, so as to stop the main-shaft at the completion of a single rotation. During the last one-tenth, substantially, of the rotation of the driving-shaft four important operations take place, viz.: the pin 30 of the lever 21 reaches the jog in the cam-groove 29, and disengages the teeth 37—38 of the clutch, and the cylinder 22 is quickly thrown back to its inoperative normal position and, since the teeth of the clutch-members are disengaged, no further movement of the feed-mechanism is possible; at the same instant the clutch is thrown, the side pin 20 of lever 21 reaches the slot 19, in the drum 17, and the lever is drawn back by its spring 139 to its normal position; the electric circuit is broken by the separation of contact-device 53—54, the cam 47 passing and the spring 50 taking control of bar 49; the torque in the magnetic-clutch ceases; and the main-shaft becomes locked by the buffer-cam. Also, during the latter portion of the rotation of the driving-shaft, the cam-disk 56 has been rotated to a position such that the jog in the cam-groove 65 will ride into coöperation with the pin 67, resulting in reversing the movement of the lever 71, and withdrawing the gear 78 from the rack-bar 80$^x$. The moment this action takes place, which is coincident with the locking of the driving-shaft, the feed-mechanism completes its feeding function and the cutting mechanism completes its cutting function.

At the time the gear 78 is moved from engagement with the rack 80$^x$, as just described, the driving-shaft 6 has completed its cycle of movement, or single rotation, it being understood that the shaft 7 also comes instantly to a stop. From the foregoing, it will be understood that the machine is at rest with power stored in the ram and all the operative parts of the machine in position ready for the repetition of a functional operation; and it should be understood, at this point, that the foregoing description is that of any one of the coin-slide mechanisms or "units" heretofore referred to, in combination with the other essentials going to make up my vending machine, and that the operation of my machine, as just given, is wholly with reference to a good coin of the proper denomination inserted in the slide, constructed and gaged, as to its coin-receiving aperture, for the reception of such coin.

If a coin of the proper thickness and diameter, but not of sufficient tensile strength, be inserted in the slide, it might pass the stop-finger 82, plate 83, gaging-disk 84, and, consequently, the stop-pin 84ª, so as to permit the movement of the coin-slide to its rear extreme and thus trip the rod 145 from its seat 146, resulting in also tripping the angle-lever and allowing the spring 147 to depress the cocking-lever 94, and drive the ram 91 with force against the coin, which has necessarily, by the complete rearward movement of the slide, been centered directly under the head 85 of the ram and seated upon the throat-plate 61—63, over the coin-escape opening 5ª in the slide-plate 3ª. As will be understood, by tripping the rod 145 and bringing into action the ram 91, as just noted, the proper connections have been established to operate the main shaft 6, which will have a complete revolution to restore the ram-mechanism and coöperating parts to normal position. But, the force of the ram striking the coin of insufficient tensile strength has been sufficient to instantly buckle the latter and drive it through the throat-plate and opening 5ª in the slide-plate, thus permitting the ram-head to fall lower or into the throat-plate and aperture 5ª, and thus cause the lever 94, with its cam 27, to drop clear past the cap-piece 28, carried at the upper end of the arm 122 of the lever 26, as shown in Fig. 8. The result is that, though the cam 27, carried by the lever 94 has, during its descent, assumed for a moment, with reference to the cap-piece 28, the proper operative relation to draw the pin 30 into the cam-groove 29, and withdraw the pin 25 from the circumferential groove 24, and though, also, the roll 110, carried by the bearing 105, has operated upon the arm 153, carried by the shaft 154, to cause the segmental-gear 155 to operate the buffer-mechanism and drive it from under the buffer-cam 42, thus permitting the rotation of the driving-shaft 6, this operative condition of parts lasting only for a fraction of a second, since the cam 27 and the roll 110 rapidly pass downwardly, the one beyond the cap-piece 28, into the position shown in Fig. 8, and the other into the depression 159 of the arm 153, thus immediately returning the pin 25 to the circumferential groove 24 and retracting the pin 30 from the cam-groove 29. In other words, the movement of the parts just described into operative and then to inoperative position occurs so rapidly that, although the buffer-mechanism is removed from interference with the buffer-cam 42, and the driving-shaft 6 is allowed to rotate, said shaft cannot move fast enough to catch the pin 20 within the circumference of the drum 17,—said pin having moved rapidly into and out of the slot 19,—and, in consequence, the clutch 9 and teeth 37—38 have not been brought into coöperative action and the gear 40 has not moved so as to drive the coöperating-gear 41 to actuate the shaft 7, and thus drive the gear 79, running to the feeding mechanism. In consequence, though the circuits are closed, the driving-shaft is given a complete rotation and the parts actuated are restored to their inoperative position ready for another or functional operation, no feeding movement has taken place, and, in consequence, no delivery has been made by the machine.

It should be understood, in connection with the spring 147 of the ram, that the same is gaged and selected with reference to the blow necessary to be imposed upon or delivered to the coin in the coin-slide and, in consequence, is tested with reference to the tensile strength of a good coin of proper thickness and denomination. Hence, any coin, which may pass the stop-devices heretofore described, and does not possess the tensile strength of a good coin of proper dimensions, will either be buckled or jammed through the throat-plate, or else will receive such a depression as to permit the lowering of the ram sufficiently to enable the parts to assume approximately the position stated with reference to Fig. 8 and thus prevent the machine from operating so as to make a delivery of articles contained therein. The operation just described with reference to a coin unable to stand the blow of the ram will also occur if the coin be too small for the aperture 5 of the coin-slide; that is to say, and at this point stress is laid upon the fact that, the seat for the coin, provided by the throat-plate 62, and the seat for the coin, provided by the fixed plate 63, are so gaged relatively to the coin, proper for the coin-slide, that the diameter of the opening between the two seats, when the throat-plate is in the position shown in Fig. 12, will be approximately one-thirty-second of an inch less than the diameter of the coin, in consequence, giving the coin a seat upon each jaw amounting to approximately one-sixty-fourth of an inch. This measurement has been worked out with reference to the tensile strength of a good coin of proper thickness and with reference to the power of the spring 147, which operates the ram. In other words, the strength of the ram-spring 147 and the diameter of the opening in the throat-plate are gaged with reference to the tensile strength of each coin which is to be the operating key for a given coin-slide mechanism; and by this it is to be understood that a nickel, or five-cent piece, is of greater tensile strength than either a dime, or a quarter, and that the latter is of greater tensile strength than a dime. In consequence, any coin placed in the coin-slide, which is not possessed of the proper tensile strength, will either be driven through the throat-plate and aperture 5ª into the coin-chute, or else so indented as to cause the parts shown in Fig. 8 to assume approximately the position of such figure, resulting in the operation of the driving-shaft, as described, without a delivery from the machine.

From the foregoing description, it will be readily understood, and upon the fact I desire to lay stress, that my machine is rendered absolutely junk-proof; that is to say, disks or rings of papers, fiber, tin, lead, brass, steel and iron, or any other material, will all be either prevented from passing into the machine, or will be rammed therethrough by the ram, so that the machine cannot be put out of action by malicious tampering. At this point, also, I desire to lay stress upon the fact that the ram-head 85 is so constructed as to impose a blow without injuring a good coin; that is to say, the head of the ram is, or may be made, rectangular, or even slightly convexed in cross-section, in contradistinction to having a form or shape which might tend to mar or mutilate the coin. At this point, also, the importance of the pawl 160, carried by the rock-shaft 161, should be noted, since, when the coin-slide has been pushed to the extreme of its rearward movement, the pawl 160 rides over the end of the coin-slide and drops into position ready for coöperation with the notch 166, which coöperation will take place immediately after the rod 145 has been tripped and the slide has been released by the hand of the operator. This coöperation of the pawl with the coin-slide occurs at the time when the coin is accurately centered under the head of the ram and over the aperture $5^a$, and properly seated on the throat-plate. In consequence, the coin is without support at any point, except upon the fixed plate 63 and the throat-plate 61, and no portion of the coin-slide surrounding the aperture $5^a$ can interfere with the operation of the ram and its continued descent through the aperture when the throat-plate has been shifted to permit the coin or check to pass through the aperture $5^a$ into the chute. Hence, nothing but the coin, thus centered or placed, can interfere with the operation of the ram, and when the throat-plate is shifted the coin has no further support and immediately tips from the stationary seat 63 and is forced through the aperture $5^a$ into the chute down which it slides to the coin-conveyer. Thus, it will be seen that the pawl 160 has an important function, in combination with the coin-slide and ram as a means for holding the coin properly for receiving the blow of the ram and as a means for so holding the slide that its aperture 5 will perfectly coincide with the throat-plate aperture and, hence, will not interpose any obstruction to the proper and accurate operation of the ram.

Up to this point, a so-called "unit" of my machine coupled with certain coöperating essentials, which latter operate in common with any number of units, has been described, and shown in Fig. 1 and it now only remains to be shown how, by duplicating certain parts of the unit and adding a few additional essential elements, a gang-machine of any predetermined size can be produced. That is to say, irrespective of the number of "units," or material-testing mechanisms, combined to produce a given gang-machine, the rock-shaft, forming part of the feeling mechanism $80^a$, may be extended and have added thereto the requisite number of arms, provided with depending stop-fingers $80^x$ corresponding to the number of units inserted in the machine. Likewise, the rock-shaft 161, forming part of the slide-holding mechanism, may be extended and provided with the requisite number of holding-pawls 160, for coöperating with the V-shaped notches 166 in the end of the coin-slides. Also, the rock-shaft 154, forming part of the buffer-mechanism, may be extended and have applied thereto arms 153, corresponding in number to the units forming part of the machine. And the rock-shaft, forming part of the positive slide-returning mechanism 55, may be extended and have applied thereto the requisite number of arms for coöperation with the rods 168, connected to the coin-slide. These additional or duplicated parts necessary to produce the gang-machine, in combination with the added coin-slide units, are operated by the same devices which, respectively, operate in the unit structure and no additional cams or operating arms are necessary for the purpose of actuating the said added parts.

It should be noted at this point, however, that the rack 33, carried by the angular-tripping lever, forming part of the cocking mechanism of each unit, and the mutilated-gear 32, coöperating with said rack, are so disposed in the machine, whether of unit or gang-type, as to normally stand, in the inoperative position of Fig. 3, so far separated as to allow the movement of said mutilated-gear without engaging its complemental-rack when anyone of the other cocking mechanisms is in operation; that is to say, as has been pointed out in Fig. 3, that rack is out of range of operation of the mutilated-gear in its normal or inoperative position, but, in its operative position, the rack has been moved into coöperative relation with the mutilated-gear, as shown in Figs. 9 and 10. In the gang-machine, this change of position from inoperative to operative, or vice versa, of the parts of the cocking mechanism, when any given unit is operated, does not affect like parts of the cocking mechanisms of the other units of the gang-machine, the mutilated-gear of each of said other units passing, in its rotation, entirely free and clear of its complemental rack, which stands apart in its inoperative normal position. Hence, the cocking mechanism of any one of the units operates, and all the mutilated-gears of all the other cocking mechanism operate, at one and the same time without hindrance or affecting in any way the cocking mechanisms of the unused units.

Having thus described my invention, what I claim and desire to secure by Letters Patent is:

1. A vending machine having, in combination, means for delivering articles therefrom; operating means for actuating the delivery means; means for actuating the operating mechanism including a device operable by a coin of predetermined tensile strength; and means for preventing a functional operation of the machine in the event the coin inserted in the machine is not of the said tensile strength.

2. A vending machine having, in combination, means for delivering articles therefrom; operating mechanism for actuating the delivery means, including an electric circuit having a closing device; means for actuating the operating mechanism including a device for testing coins for tensile strength; and means for closing said circuit during the operation of said testing device.

3. A coin-controlled mechanism for vending machines having, in combination, a reciprocatory coin-receiving slide; and means operating relatively to the path of movement of the slide so as to engage the coin contained therein at a given point in the travel of said slide; and means for driving said device with force against said coin.

4. A coin-controlled mechanism for vending machines having, in combination, a reciprocatory slide provided with a coin-receiving aperture; a throat-plate located in coöperative relation to said slide, said throat-plate being provided with coin-supporting means; a ram arranged in coöperative relation to the slide and plate; and means for tripping said ram into action at the moment the coin is brought into coöperative relation with the supporting means of said throat-plate.

5. A coin-controlled apparatus for vending machines having, in combination, a coin-receiving slide, a ram for imposing a blow upon said coin; means for driving said ram against the coin; and means located in the path of movement of the coin-receiving means for tripping said ram into operation.

6. A coin-controlled mechanism for vending machines having, in combination, a coin-receiving slide; a ram for imposing a blow upon said coin; means for normally holding the ram in elevated position; a tripping mechanism located in the path of movement of the slide; means coöperating with the ram and trip mechanism whereby said ram may be driven into action when the trip mechanism is actuated by the slide.

7. A coin-controlled apparatus for vending machines having, in combination, a coin-receiving slide; a ram for imposing a blow upon said coin; a trip-mechanism for suspending the ram in an inoperative position; a driving-shaft; and means between the latter and ram whereby, when the trip-mechanism is operated, the driving-shaft may be started into operation and simultaneously therewith a blow imposed upon the coin.

8. A coin-controlled apparatus for vending machines having, in combination, a coin-receiving slide; a ram arranged in operative relation to said slide for imposing a blow upon the coin carried thereby; a lever-mechanism for holding the ram in suspension; a driving-shaft; and connections between the driving-shaft and the lever-mechanism whereby, when the latter is tripped into action, the shaft and the ram will be set in action and the consequent action of the said driving-shaft will depend upon said connections.

9. A coin-controlled mechanism for vending machines having, in combination, a coin-receiving slide; a ram arranged in coöperative relation thereto; a driving-shaft; intermediate connections between said shaft and said ram whereby both the shaft and the ram may be tripped into action by the movement of the slide, said intermediate connections comprising a lever pivotally connected to the ram and carrying a cam; and means coöperating with the cam arranged in coöperative relation with the driving-shaft.

10. A coin-controlled apparatus for vending machines having, in combination, a coin-receiving slide; a ram disposed in coöperative relation to said slide; a driving-shaft carrying a clutch mechanism and a cam; intermediate connections between said driving-shaft and said ram; means whereby said intermediate connections may be tripped into action so as to bring the clutch into operation and drive the cam; and means for engaging the slide arranged in coöperative relation to said cam.

11. A vending machine having, in combination, a coin-controlled apparatus; a ram arranged in coöperative relation thereto to impose a blow upon the coin; means for tripping the ram into operation to impose such blow; and means for resetting the ram including a mutilated-gear and rack-bar.

12. A vending machine having, in combination, coin-controlled apparatus; a ram arranged in coöperative relation thereto to impose a blow upon the coin; means for tripping the ram into operation to impose such blow; and means for resetting the ram including a spring-controlled plunger.

13. A coin-testing apparatus for vending machines comprising a spring-controlled ram, a reciprocable slide for presenting the coin to the ram; means for holding said ram in cocked position; and means for tripping said ram into operation.

14. A coin-testing apparatus for vending machines comprising a spring-controlled ram; a reciprocable slide for presenting the coin to the ram; means for holding said ram in cocked position; means for tripping said ram into operation; and means for recocking the ram.

15. A coin-testing device for vending machines comprising a spring-controlled ram; and means for holding said ram cocked, including a vibratory lever and a sliding connection between said lever and said ram.

16. A coin-testing device for vending machines having, in combination, a spring-controlled ram; means for holding the ram in cocked position; and means for tripping the ram into operation, including an angular lever, a rack carried thereby, and means for coöperating with said rack to recock the ram.

17. A vending machine having, in combination, a driving-shaft; a clutch mechanism carried thereby including a reciprocating member; a spring-controlled ram; a reciprocatory coin-receiving slide; means whereby the slide may trip the ram into operation; and means connecting the ram-tripping mechanism with the said movable clutch-member whereby, as the ram is tripped into action, the said clutch-member will be shifted.

18. A coin-testing mechanism for vending machines comprising a driving-shaft; a clutch mechanism carried thereby; a ram for imposing a blow upon the coin; means for holding the coin in the path of the ram; means for actuating the ram and simultaneously actuating the clutch-mechanism for starting the shaft into operation; a feeding-mechanism operable by the driving-shaft; and means whereby the feeding mechanism will be actuated only when the ram operates upon a good coin.

19. A coin-testing apparatus having, in combination, a coin-slide; a ram for imposing a blow upon the coin held in the coin-slide; means for actuating the ram; and mechanisms operating simultaneously to reset the ram and return the coin-slide to normal position.

20. A coin-testing apparatus comprising a driving-shaft; a clutch-mechanism carried thereby; a controller for opening and closing the clutch; a ram; means for supporting a coin within the path of operation of the ram; and means whereby the character of the coin acted upon by the ram will determine the action of the controller.

21. A coin-testing apparatus comprising a driving-shaft; means for normally holding the same from rotation; a controlling mechanism for releasing the shaft from its holding means; a ram for imposing a blow upon the coin; means for actuating the ram; and connections between the controller and the ram mechanism whereby the operation of the controller will depend upon the action of the ram.

22. A coin-testing apparatus comprising a coin-slide for containing a coin; a throat-plate coöperating with the coin-slide for supporting the coin; a ram for imposing a blow upon the coin supported by the throat-plate; means for actuating the ram; and means for actuating the throat-plate after the ram has acted upon the coin to release the latter.

23. A coin-testing apparatus comprising a driving-shaft; a ram; means for actuating the ram; an electric circuit; means for closing the circuit at one point as the ram goes into action so as to start the driving-shaft; and means for opening the said circuit at the said point and closing said circuit at another point during the action of the driving-shaft; and a feeding mechanism actuated by the driving-shaft upon closing the circuit at the second point.

24. A coin-testing apparatus having, in combination, a driving-shaft; a ram; connections between the driving-shaft and the ram for starting the shaft into action; means for operating the ram; an electric circuit having one branch closed when the said connection is operated; means on the shaft for opening said branch of the circuit and closing another branch; feeding means; and means for actuating said feeding means when the second branch of the circuit is closed.

25. A coin-testing apparatus having, in combination, a coin-slide having an aperture for receiving a coin; a means for imposing a blow upon the coin in the slide; and means for holding the slide positively in position such that the blow-imposing means will strike directly upon the coin.

In testimony whereof I have hereunto signed my name in the presence of two subscribing witnesses:

ELIAS H. KELLEY.

Witnesses:
 CHAS. McC. CHAPMAN,
 E. A. NASH.